Aug. 19, 1952     D. J. RAUN     2,607,242
AUTOMATIC FLUID DRIVE
Filed May 24, 1950     5 Sheets-Sheet 1
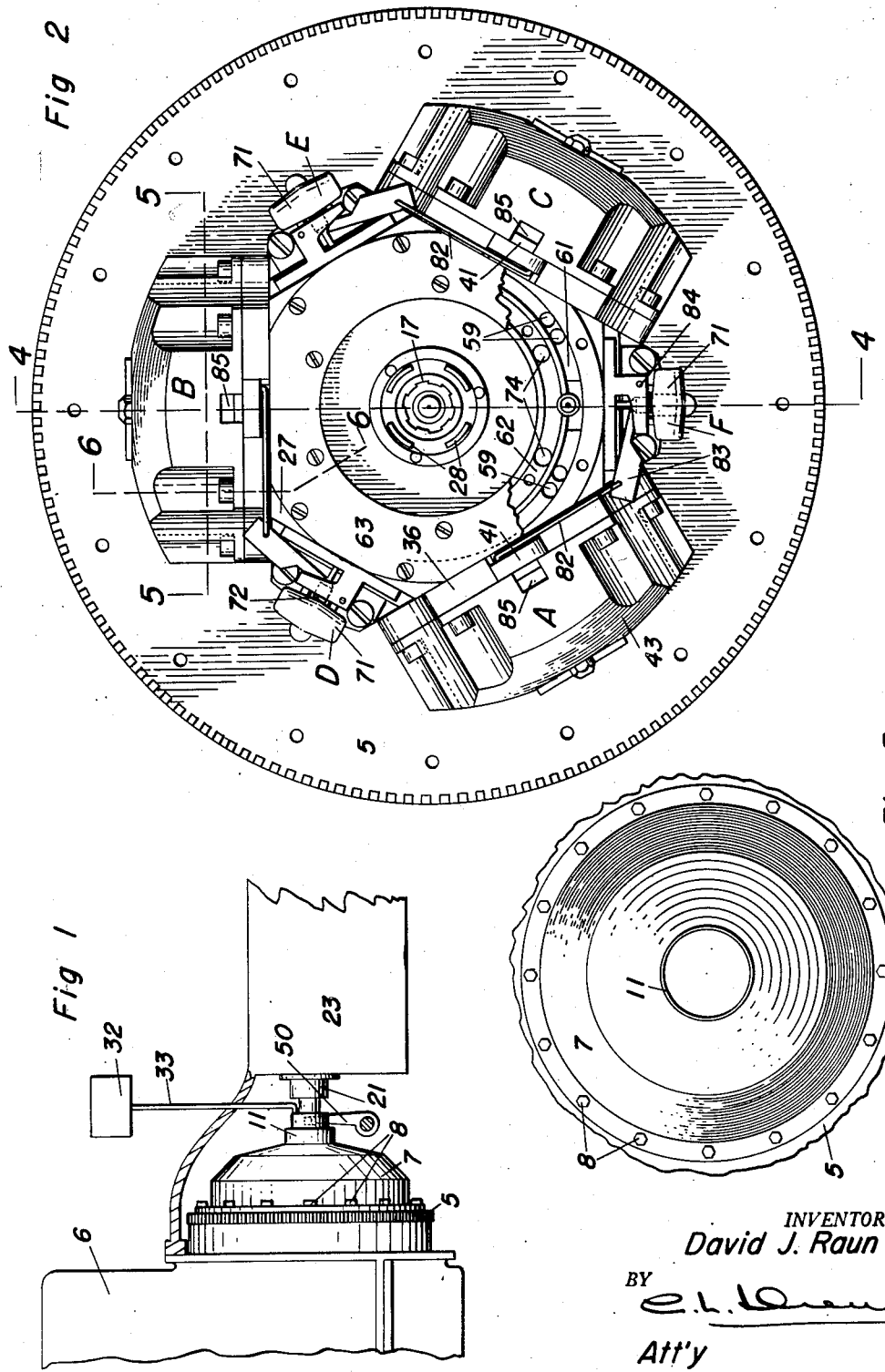
INVENTOR.
David J. Raun
BY
Att'y Aug. 19, 1952     D. J. RAUN     2,607,242
AUTOMATIC FLUID DRIVE
Filed May 24, 1950     5 Sheets-Sheet 2
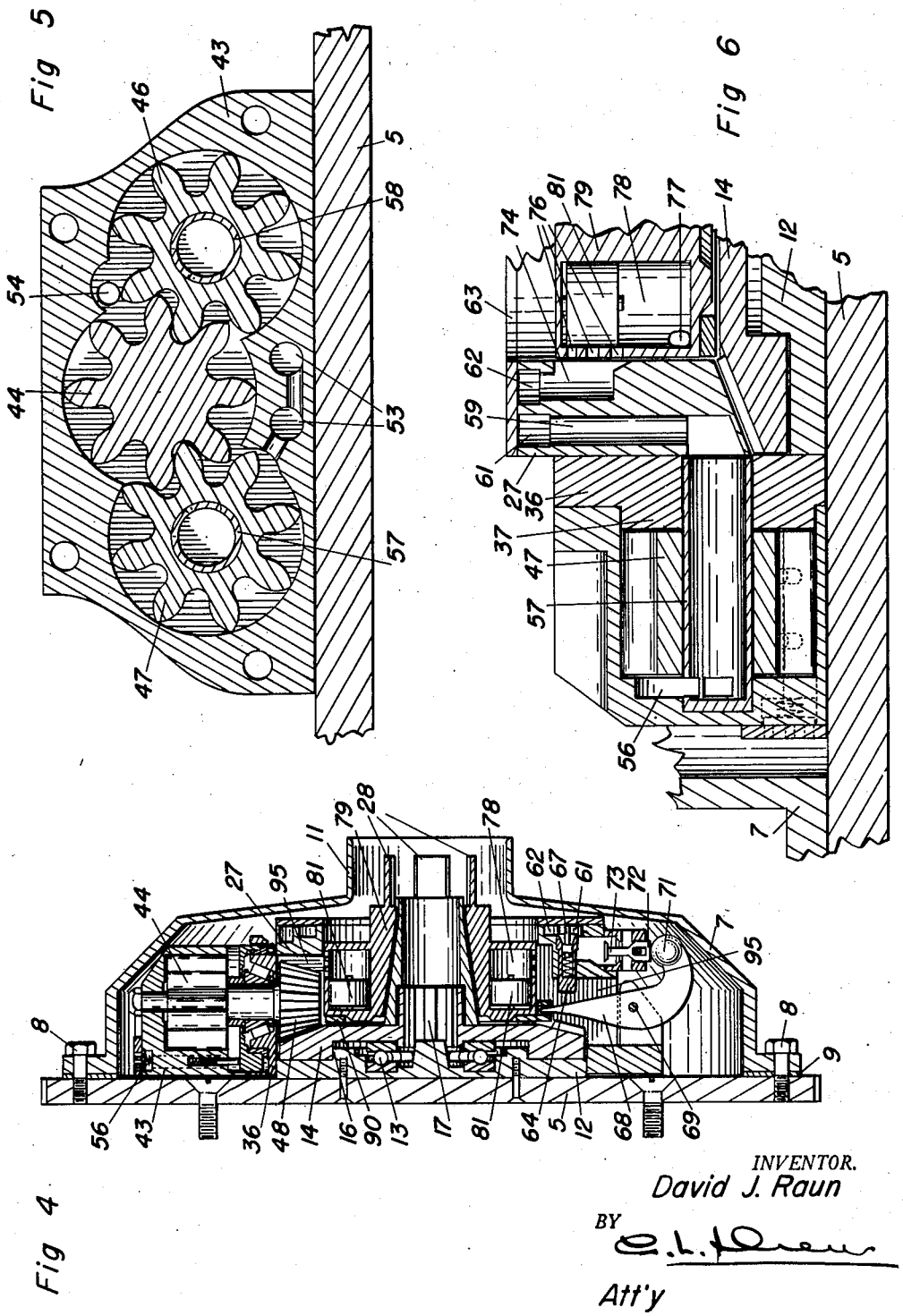
INVENTOR.
David J. Raun
BY
Att'y Aug. 19, 1952 D. J. RAUN 2,607,242
AUTOMATIC FLUID DRIVE
Filed May 24, 1950 5 Sheets-Sheet 3
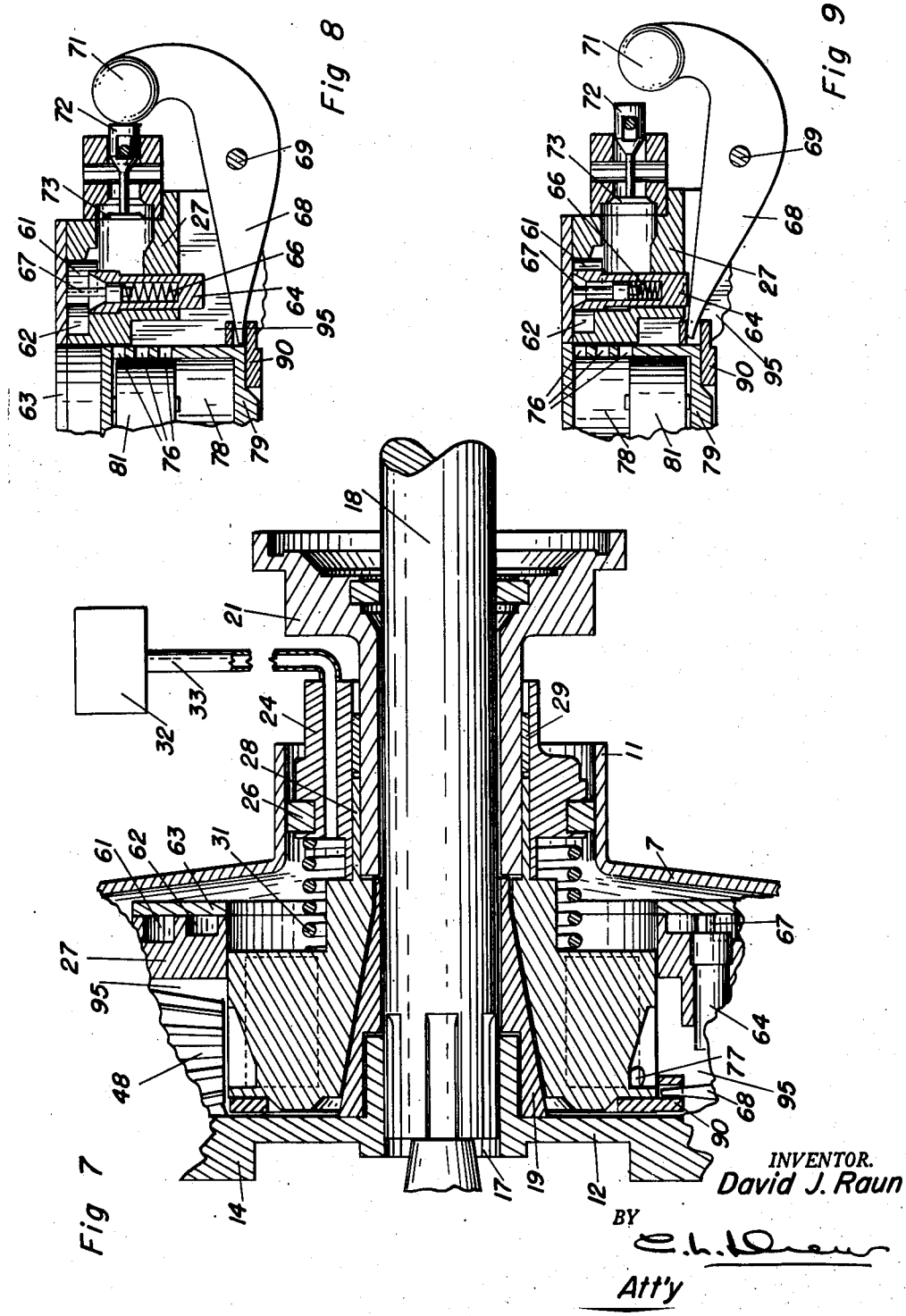
INVENTOR.
David J. Raun
BY
Att'y Aug. 19, 1952 D. J. RAUN 2,607,242
AUTOMATIC FLUID DRIVE
Filed May 24, 1950 5 Sheets-Sheet 4
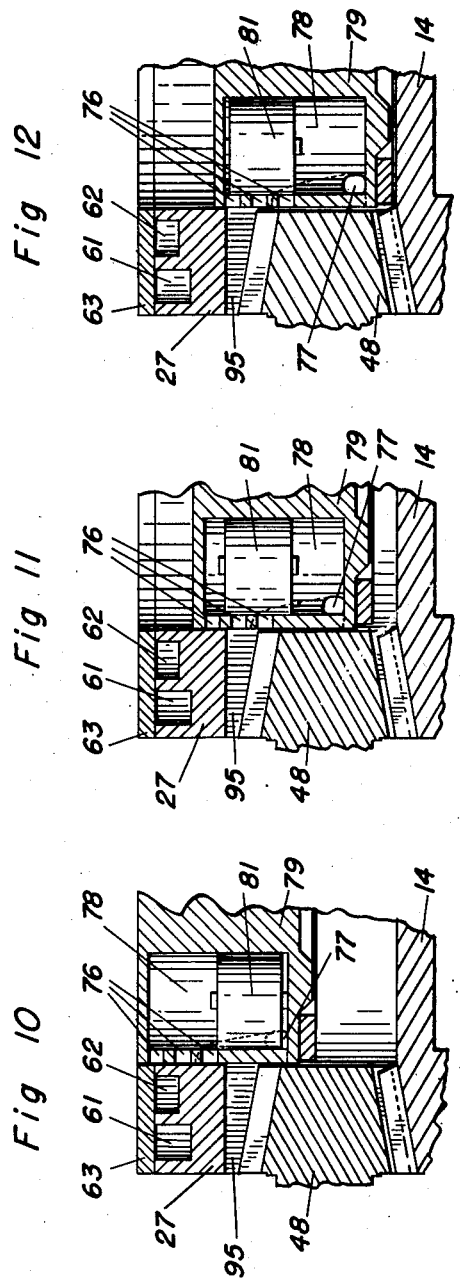
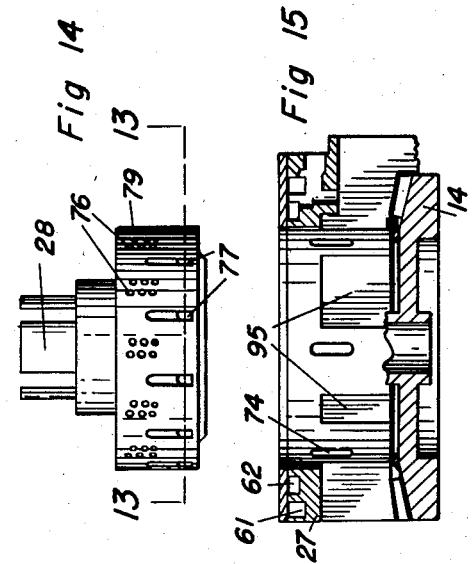
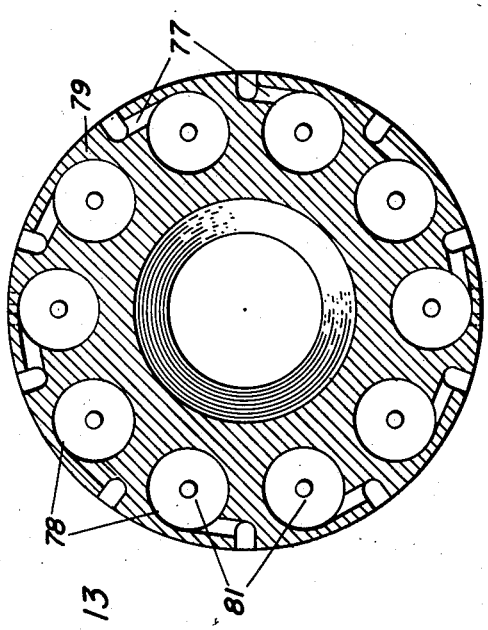
INVENTOR.
David J. Raun
BY
Att'y Aug. 19, 1952 D. J. RAUN 2,607,242
AUTOMATIC FLUID DRIVE
Filed May 24, 1950 5 Sheets-Sheet 5
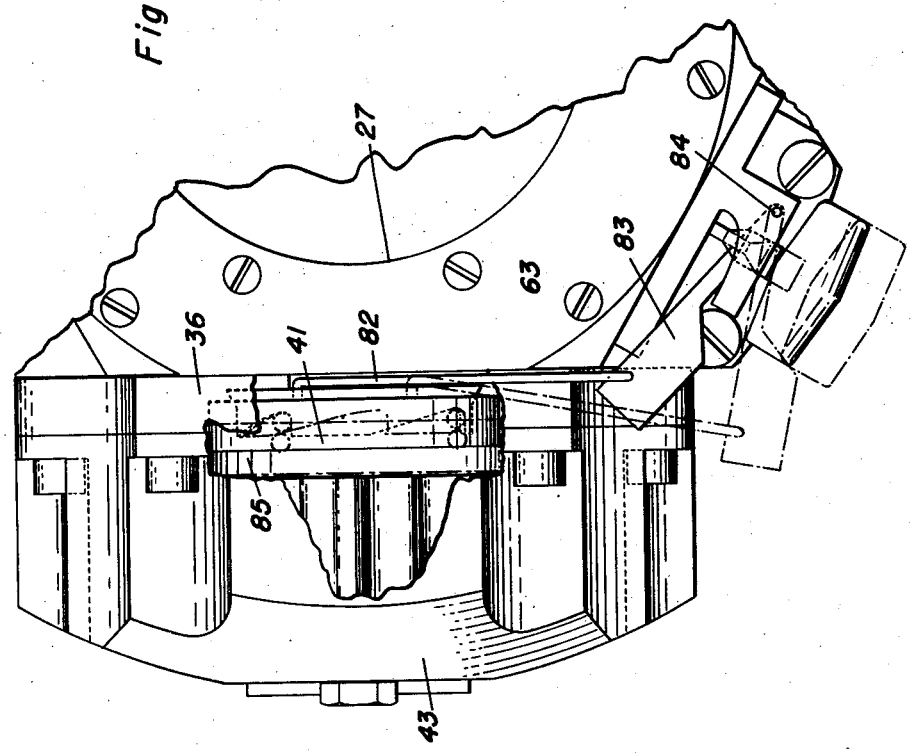
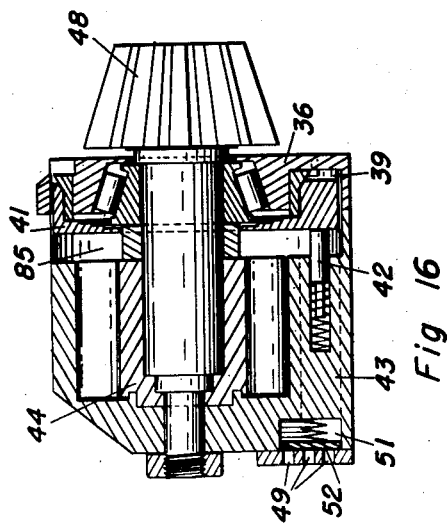
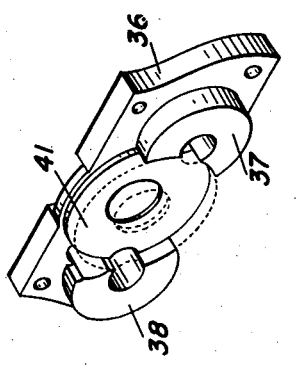
INVENTOR.
David J. Raun
BY
Att'y Patented Aug. 19, 1952

2,607,242

UNITED STATES PATENT OFFICE 2,607,242

AUTOMATIC FLUID DRIVE

David J. Raun, Palm Springs, Calif.

Application May 24, 1950, Serial No. 163,970

4 Claims. (Cl. 74—774)

This invention relates to improvements in automatic fluid drives and has particular reference to a hydraulically-actuated device.

The principal object of this invention is to provide an automatic fluid drive for the purpose of connecting a driving unit to a driven unit, which device will control variations in the speed ratio between the driving unit and the driven unit.

A further object is to produce a device of this character which may be substituted for the ordinary connecting unit or clutch mechanism; as, for instance, a clutch as used in a motor vehicle.

A further object is to produce a device of this character which is simple in construction, easy to assemble and disassemble, as well as to manufacture.

A still further object is to produce a device wherein there is a positive mechanical connection between the driving unit and the driven unit when the parts are in what would be termed, "high gear."

Other objects and advantages will be apparent during the course of the following description.

In the accompanying drawings forming a part of this specification and in which like numerals are employed to designate like parts throughout the same, Fig. 1 is a side elevational view of my device as the same would appear when interposed between the engine and the propeller shaft, or transmission casing, as the case may be, Fig. 2 is a top-plan view of my transmission mounted upon the fly wheel of an engine and with the cover removed, Fig. 3 is a top-plan view of the cover of my transmission on a reduced scale, Fig. 4 is a cross-sectional view taken on the line 4—4 of Fig. 2, and with the cover plate in place, Fig. 5 is an enlarged cross-sectional view, taken on the line 5—5 of Fig. 2, and showing one of the pump mechanisms, Fig. 6 is an enlarged cross-sectional view taken on the line 6—6 of Fig. 2, and showing the pump delivery and metering valve, Fig. 7 is an enlarged fragmentary detail view, showing the spring thrust for the meter valve, Fig. 8 is a fragmentary cross-sectional view of one of the centrifugal counter-weights, holding the relief valve in open position, Fig. 9 is a similar view, showing the valve in closed position, Fig. 10 is a fragmentary cross-sectional view on an enlarged scale, of one of the meter cylinders and pistons, the meter valve being in closed position, Fig. 11 is a similar view, showing the meter valve substantially half-way open, Fig. 12 is a similar view, showing the meter valve in full open position, Fig. 13 is an enlarged cross-sectional view of the meter valve taken on the line 13—13 of Fig. 14, Fig. 14 is a side elevational view of the meter valve, as a whole, Fig. 15 is a cross-sectional view of the meter valve housing, Fig. 16 is a cross-sectional view, partly in elevation, and on an enlarged scale of one of the pump units and idling relief valve, Fig. 17 is a perspective view of the idling relief valve and mounting plate, and Fig. 18 is a fragmentary top-plan view of the idling relief valve governor control, portions thereof being broken away to show the interior mechanism.

With the ordinary fluid drive there is usually provided a series of planetary geared units which are automatically engaged or disengaged to accomplish a so-called gear change ratio, the engaging and disengaging being accomplished through hydraulically actuated clutch bands. Therefore, there is a definite change in gear ratio consisting of two or more steps and depending upon variation in engine speed to take care of the apparently-smooth flow of power.

In applicant's device, there is a gradual change in the driving connection from so-called "low" to "high" and vice versa, thus eliminating any jerking action through the control of the flow of a hydraulic fluid through the device through a metering arrangement.

Referring to the accompanying drawings wherein, for the purpose of illustration, is shown a preferred embodiment of my invention, the numeral 5 designates the ordinary fly wheel of a motor, the motor being designated, as a whole, by the numeral 6 (see Fig. 1).

It is to this fly wheel that I attach my transmission, encased in a housing 7, which is, in turn, secured to the fly wheel by bolts 8.

A gasket is provided at 9, to seal fluid within the housing 7. This housing has an outstanding tubular projection 11, the purpose of which will be later seen.

Secured to the fly wheel 5 is a plate 12, which plate serves to position a thrust bearing 13, against which the master drive gear 14 rests. It is held against side movement by a collar 16, entering a recess formed in the gear.

This gear 14 has a splined hub 17, into which the slotted end of the propeller shaft 18 slides.

Also secured to the hub of the gear 14 by splines or in any other manner, is a cone-shaped extension 19, which forms a brake against which the meter valve engages when the meter valve is moved into idling position.

Surrounding the propeller shaft 18 is a fitting 21 (see Fig. 7) which has one end connected to the ordinary transmission casing 23, or to any other part of the vehicle whereby the same is held against rotation.

Positioned on this fitting is a ring 24, which carries a seal 26 engaging the inner surface of the tubular extension 11 of the housing 7.

Also slidable on the extension of the fitting 21 is the split end, or fingers 28 of the metering valve 79, which fingers engage similar fingers 29, formed upon the outer surface of the fitting 21, as shown in Fig. 7. This arrangement holds the metering valve 79, against rotation, but allows endwise movement.

A spring 31 tends to keep the metering valve in engagement with the cone 19.

Therefore, when the ring 24 is pushed in through the use of the foot pedal and lever 50, the metering valve 79, cone 19, and master gear 12, are held against rotation.

In order to fill the interior of the housing 7, I provide a tank 32, from which, through the medium of a pipe 30, oil may pass through the ring 24, and into the interior of the housing. The purpose of the oil within the housing is to supply a driving fluid to be used by the pumps, as will be hereinafter described.

Secured to the fly wheel are three radially-spaced pumping units, designated as a whole in Fig. 2, by the letters A, B, and C. These pumps are also secured to the sides of the meter valve casing 27, which is also secured to the fly wheel.

Positioned between each of the pumping units is a centrifugal governor arrangement, to be later described and designated, as a whole, in Fig. 2, by the letters D, E and F. As each of the pump units and each of the centrifugal governors is identical, but one will be described.

Referring, now, to Figs. 6, 16, and 18, it will be noted that, secured to the meter housing 27, is a mounting plate 36, which has two substantially semi-circular projections 37 and 38, and a recess 39, in which is slidably positioned an idling relief valve 41, which is normally held in open position by a series of spring-pressed plungers 42, which are mounted in the pump housing 43, which is, in turn, bolted to the plate 36 and meter valve housing 27, thus securing the pump unit to the assembly, as a whole.

Rotatably positioned in the housing 43, is a driving impeller 44, which, in turn, meshes with driven impellers 46 and 47, the impeller 44 being driven through the medium of a bevelled gear 48, which meshes with a master gear 14 (see Fig. 4).

In order to admit oil from the interior of the housing 7, to the pump unit, I provide inlet ports 49, which communicate with a chamber 51, within which is mounted a spring-pressed valve 52.

This chamber communicates with ports 53 and 54 (see Fig. 5), whereby oil is delivered to the suction side of the pump impellers. The pumped oil is then delivered through discharge ports 56 into tubular shafts 57 and 58, upon which the impellers 47 and 46 respectively rotate. These shafts, in turn, discharge the oil into vertical passageway 59, in the meter valve casing 27, from which the oil is distributed through an annular channel 61 (see Figs. 2 and 6). A second annular channel 62, concentric with the channel 61, receives oil therefrom when the centrifugal governor arms are in idling position, which position is shown in Fig. 8.

A plate 63, overlies the channels 61 and 62 and serves to seal the same.

In order to control the flow of oil between the two channels 61 and 62, I provide valves, best illustrated in Figs. 8 and 9, where it will be noted that the tubular-shaped valve 64, is normally held in its lowermost position through the medium of a spring 66, and a spring plunger 67, the upper end of which engages the plate 63.

It is to be here noted that the bottom of this valve 64, is in alignment with and adapted to be contacted by the arm 68 of a centrifugal governor, pivoted as at 69 and having a weighted end 71.

This weighted end 71, when in idling position, engages the end 72, of a relief valve 73, which relief valve and its mounting communicate with the channel 61, and the interior of the housing 7.

The purpose of this valve 64, is to control the action of the centrifugal governors through the building up of pressure in the channels 61 and 62, which tend to hold this valve 64, in its idling position, thus retarding the tendency of the governors to move outwardly too rapidly through centrifugal force, as will be seen later in this specification.

Oil from the channel 62, is delivered downwardly through ports 74, into one of the chambers 78, in the metering valve 79. This metering valve is doughnut-shaped and has a plurality of concentrically-arranged bores, each one of which has ports at the top and the bottom thereof, as shown at 76 and 77, in Figs. 6 and 14.

This metering valve, as before mentioned, is slidable in the meter valve casing, as best shown in Figs. 10 to 12, but held against rotation, as before mentioned, by the fingers 28, the result being that the sliding action covers or uncovers the port 76, to control the amount of discharge of oil that can be passed from the ports 74 into the ports 76 or 77.

Essentially, the purpose of this metering valve is to control the rate of flow of oil therethrough, which is done by limiting the stroke of a plurality of freely-moving pistons 81, and by thus controlling the stroke of these pistons, the oil passing through the meter is controlled to a very fine degree.

Assuming that my device is attached to an automobile engine for the purpose of delivering power to the rear wheels of the vehicle, the action would be as follows:

Assuming that the housing has been completely filled with oil and that the engine is running and that the parts are in idling position:

At this time the metering valve will be in the position shown in Figs. 6 and 12, and the centrifugal governors will all be in the position shown in Fig. 8, and the relief valve 73, will be held open through the weighted end 71 being in engagement with the head 72 thereof.

Also, the idling relief valve 41, will be in open position, as shown in Fig. 16, and in full lines in Fig. 18.

It will be noted that this idling relief valve 41, has a pull rod 82, which is, in turn, connected to a weighted arm 83, pivoted as at 84, and having engagement with a slot formed in the end 72, of the relief valve 73.

Now, assuming that it is desired to proceed along the highway, the act of increasing the engine speed will, in turn, cause the fly wheel to revolve at a high speed and assuming that foot pressure on the idling lever 50, has been released, the increase in engine speed will cause the weighted arms 83, to immediately move from their full-line position of Fig. 18, to the dotted-line position which will cause the idling relief valve 41, to close the port 85. This valve is moved laterally through a plurality of cams, shown in dotted lines in Fig. 18. As soon as this port 85, is closed, the pump impellers will tend to pump fluid which will be discharged through the hollow shafts 57 and 58 and into the vertical channels 59, thence into the channel 61, over the top of the valves 64, and into the channel 62, for discharge through the ports 74 (see Fig. 6), and through ports 76 into the meter 79, which will then be in the position shown in Figs. 6 and 12.

As the piston 81, is now at the top of the cylinder, so to speak, as viewed in Figs. 10 to 12, oil can only be discharged into the bottom of the cylinder and insomuch as the meter is held stationary while the rest of the parts are revolving thereabout, there will be no particular pumping action, or metering action taking place.

At the same time that the weighted arms 83, close the idling relief valve and ports 85, the relief valve 73, is also allowed to close as the weighted end 71, of the governors moves away from the end 72. Therefore, there will be no further leakage of oil from the pumps and, consequently, the oil will have to pass through the metering arrangement.

As the speed of the engine increases, the centrifugal action will cause the governors to immediately move outwardly, causing their ends 68 to rise from the position shown in Fig. 8, toward that shown in Fig. 9. This will, in turn, cause the metering valve to move upwardly through the fact that the three governors are each connected to a pusher ring 90, underlying the metering valve and serving to equalize the action of the governors.

The ends 68, of the governor arms will also move the valve 64, upwardly so as to tend to shut off the flow of oil from the channel 61, to the channel 62. This governor action is relatively slow, for the reason that the back pressure on the valve 64, tends to retard the action of the governor which is controlled by the load placed upon the engine.

Previous to the valve 64, reaching the position shown in Fig. 9, oil has been discharged through the metering device in the following manner:

Oil from the port 74, will either discharge into the top or the bottom of one of the chambers 78, in the meter 79. As the ports 76 and 77 are staggered, they will alternately come into alignment with the discharge from the port 74 and, therefore, oil will be delivered either to the top or the bottom of the chamber. Consequently, a pumping action will take place in each one of the cylinders, with the result that a given quantity of oil will be admitted to one end of the piston and discharged from the opposite end and then the reverse will take place, the oil being discharged back into the general supply.

It is obvious that any oil that enters the cylinder either above or below, must be discharged if a pumping action of the piston is to take place. Therefore, in the metering valve casing, I provide a series of ports 95, through which the discharge may take place, back to the supply.

The action of the metering device is as follows:

Assuming that the parts are in the position shown in Fig. 11:

We are now slightly above idling speed and oil will be delivered from the port 74 (not shown in this figure; see Fig. 6), through ports 76, to a point above the piston 81, and oil below the piston will be discharged through one of the ports 95. Therefore, as the piston is free to move downwardly, a certain quantity of oil will be taken into the top of the cylinder and a certain quantity will be discharged from the bottom of the cylinder. As the metering casing moves around, it will come into alignment with the next port 74 of the meter, but there will be a reverse action in that the oil will be discharged from the port 74, into the port 77, causing piston 81, to thus move upwardly, thus forcing out the oil from the top of the cylinder through the discharge ports 76 into port 95, as long as all of the ports 76 and 95, are in alignment with each other. In other words, each one of the cylinders performs a filling and dumping action, taking oil in from one of the ports 74, and dumping it out through one of the ports 95.

Now, by moving the metering valve in the metering valve housing, I can control the amount of oil passing through each of the chambers by closing off the ports 76. The movement of this metering valve is nicely controlled by the centrifugal governors and the amount of load causing back pressure through the valves 64, will, in turn, act as dampers on the too rapid movement of the centrifugal governors.

It is obvious that the shorter the stroke of the pistons 81, the less volume of oil will be passed through the metering device and that the longer the stroke, the more oil will pass therethrough. As the flow of oil through the pumps diminishes, resistance is set up within the pumps to decrease their rate of rotation and, as these pumps control the rate of rotation of the gears 48, which mesh with the master drive gear, it will be obvious that the rate of rotation of the master drive gear and its connecting propeller shaft will be controlled. When there is a free flow of oil through the meter, then the gears 48, will merely revolve in planetary fashion about the master driving gear, but, as the rate of flow through the meter decreases, back pressure will be set up to cause a rotation of the master drive gear until a time when the entire oil supply will be shut off; and, at this time, the gears 48, will become stationary with relation to the master drive gear 14; and, at this time, there will be a direct connection from the motor to the rear wheels.

If the load increases to a point where the engine starts to slow down, then the governors will start to react to move the meter valve inwardly, thus permitting more oil to begin to flow through the meter, at which time the gears 48, will start to rotate and a reduction in gear ratio will take place to take care of the increased load.

It will thus be seen that I have produced a device which will accomplish all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a device of the character described a driven fly wheel, a master gear rotatably supported on said fly wheel and concentric with the axis of rotation thereof, a plurality of pumping units secured to said fly wheel and radially arranged with respect to said master gear, each of said pumping units having a geared connection with said master gear, a fluid confining housing secured to said fly wheel and enclosing said pumps and governor-controlled metering means for controlling the flow of oil through said pumps, whereby the rate of movement of said pumps and their geared connections to said master gear may be varied.

2. In a device of the character described, a driven plate, a master gear rotatably mounted on said plate and having its axis of rotation concentric with the axis of rotation of said plate, a plurality of radially-disposed pumping units secured to said plate, each of said pumping units having geared connection with said master gear, means for connecting a driven shaft to said master gear and valved means for admitting oil to said pumping units, a sliding metering device for receiving oil from said pumps and discharging said oil therethrough at a controlled rate.

3. In a device of the character described, a driven plate, a master gear rotatably mounted on said plate and having its axis of rotation concentric with the axis of rotation of said plate, a plurality of radially-disposed pumping units secured to said plate, each of said pumping units having geared connection with said master gear, means for connecting a driven shaft to said master gear and valved means for admitting oil to said pumping units, a sliding metering device for receiving oil from said pumps and discharging said oil therethrough at a controlled rate, said metering device comprising a doughnut-shaped member having a plurality of cylinders formed therein, said cylinders having ports formed at opposite ends thereof and free-moving pistons mounted in said cylinders, the sliding of said metering device opening and closing ports to control the flow of oil to the opposite ends of said cylinders.

4. In a device of the character described, a driven plate, a master gear rotatably mounted on said plate and having its axis of rotation concentric with the axis of rotation of said plate, a plurality of radially disposed pumping units secured to said plate, each of said pumping units having geared connection to said master gear, a driven shaft connected to said master gear for rotation therewith, valve means for admitting oil to said pumping units and annular casing secured to said pumping units, said casing having passages formed therein to receive oil from each of said pumping units, a metering valve slidably positioned in said annular casing, said metering valve having a plurality of chambers formed therein, ports formed in each end of said chambers to receive and discharge oil from said casing passages, a free moving piston mounted in each of said cylinders, and means for sliding said metering valve in said casing to cause an opening and closing of said ports to control the flow of oil to the opposite ends of said cylinders whereby the rate of flow of oil will variably control the rotation of said pumping units and through said master gear to said driven shaft.

DAVID J. RAUN.

REFERENCES CITED

The following references are of record in the file of this patent:

UNITED STATES PATENTS

| Number | Name | Date |
|---|---|---|
| 1,249,660 | Olson | Dec. 11, 1917 |
| 1,961,619 | McClain et al. | June 5, 1934 |
| 1,990,212 | Toncich | Feb. 5, 1935 |